United States Patent Office 3,033,906
Patented May 8, 1962

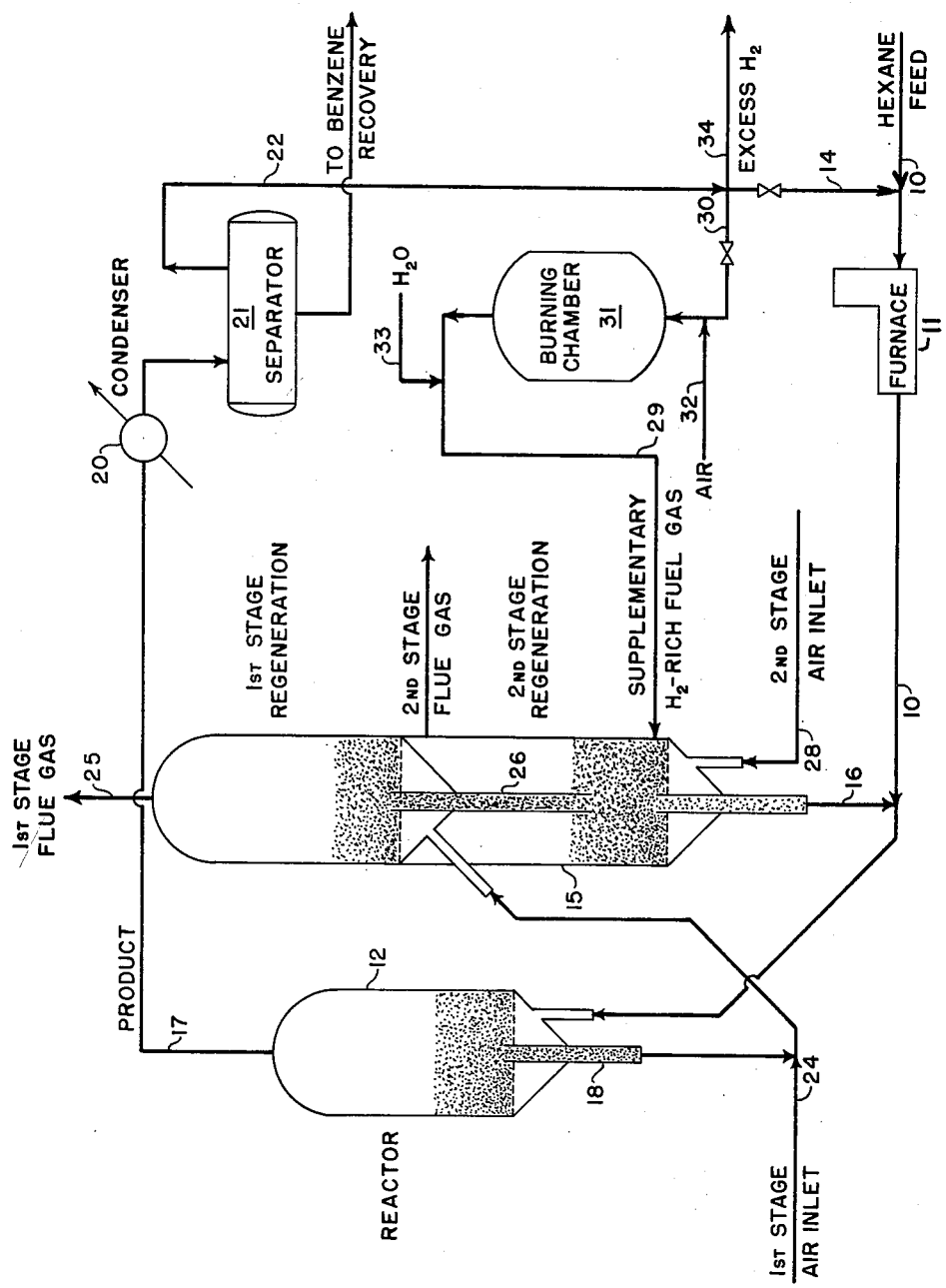

3,033,906
PROCESS FOR CONVERTING NORMAL
HEXANE TO BENZENE
Russell G. Hay, Fox Chapel, and Ralph W. Helwig, Oakmont, Pa., assignors to Gulf Research & Development Company, Pittsburgh, Pa., a corporation of Delaware
Filed Aug. 6, 1958, Ser. No. 753,507
3 Claims. (Cl. 260—673.5)

This invention relates to a hexane aromatization process and more particularly to a fluid catalytic process for converting high purity hexane feed stocks to benzene, including an improved method for continuous regeneration of the fluidized catalyst and for supplying heat to the endothermic aromatization stage.

Production of benzene is important to the chemical and petroleum industries because of the value of benzene as a high octane component of gasolines, as a solvent and as a chemical intermediate in the production of many valuable products. The aromatization of hexane fractions to produce benzene is well known. A fraction containing such hexanes as normal hexane and/or cyclohexane is contacted at high temperature, e.g., above 1000° F., in the presence of hydrogen with a solid dehydrogenation catalyst such as chromia or molybdena on alumina. The cyclization and dehydrogenation reactions which result in the formation of benzene are highly endothermic. Conventionally, the heat required to maintain the reaction is supplied by preheating the feed and by burning coke from the catalyst and thereby heating the catalyst to the required high temperature. This can be done in a fluid catalytic system by continuously circulating catalyst between a catalyst regeneration zone and the aromatization zone.

It is advantageous to produce benzene from hexane fractions of high purity instead of from impure fractions that contain higher boiling hydrocarbons or excessive quantities of C$_5$ ring compounds. The advantage lies in the fact that the wasteful production of coke by decomposition of higher boiling hydrocarbons and C$_5$ ring compounds can be avoided and high catalytic activity can be maintained by avoiding inactivation which is caused by excessive coke deposition. However, if only a small amount of coke is deposited on the catalyst, the entire heat supply for the endothermic aromatization process cannot be obtained merely by burning the coke from the catalyst in the regeneration stage. An extraneous fuel must be burned to supply some of the needed heat of reaction. It has been suggested to burn hydrocarbon gases such as methane and ethane and to contact the hot gaseous combustion product with the aromatization catalyst during the regeneration stage to heat the catalyst.

The gas made by burning a hydrocarbon is composed mainly of carbon dioxide and steam. We have discovered that contacting a chromia-alumina catalyst with this gaseous mixture containing carbon dioxide has an unexpectedly bad effect on the aromatization activity of the catalyst. We have now developed a method for supplying heat to a fluidized catalyst during regeneration such that the high aromatization activity of the catalyst is maintained. We have made a valuable improvement in the procedure of heating a fluidized chromia-alumina aromatization catalyst during regeneration by burning a fuel which forms a combustion product that can be passed in direct heat exchange with the catalyst without lowering its activity.

In general, our process comprises contacting a hexane fraction consisting essentially of n-hexane or cyclohexane or mixtures thereof in an aromatization zone in the presence of hydrogen and at high temperature with a finely divided fluidized chromia-alumina catalyst. A stream of catalyst having a carbonaceous deposit thereon is continuously withdrawn from the aromatization zone. The stream of catalyst is passed to a catalyst regeneration zone and is contacted at carbon-burning temperature with air or oxygen. A gas consisting essentially of hydrogen is burned in a separate burning zone to produce a hot gaseous combustion product. The catalyst is thereafter passed to a subsequent regeneration zone where it is contacted with oxygen or air and with the hot gaseous combustion product from said combustion zone at a temperature of at least 1000° F. The regenerated catalyst heated to a temperature of at least 1000° F. is then returned to the aromatization zone.

We will describe our invention in more detail by reference to the drawings of which the sole FIGURE is a schematic flow diagram of our process and of apparatus therefor.

Referring to the drawing, the hexane charge stock such as a straight run hexane fraction containing, for example, 80 volume percent n-hexane, is charged via line 10 and furnace 11 to reactor 12 in which a finely divided or powdered chromia-alumina catalyst is maintained in a fluidized bed, or in other words, is turbulently suspended in an upflowing vapor stream.

From line 14 a recycled gas stream containing, for example, about 80 percent hydrogen is mixed with the hexane feed before it enters the furnace 11. The mixed hydrocarbon-hydrogen stream is preheated to a temperature, for example, of about 1020° F. A stream of hot regenerated catalyst withdrawn from the bottom of the catalyst regenerator 15 by line 16 at a temperature, for example, of about 1070° F. is introduced into the feed line 10 and the vaporized hydrocarbon-hydrogen stream containing suspended regenerated catalyst is passed into the fluidized catalyst bed of aromatization reactor 12. To avoid contact of hot hydrocarbon feed with the regenerated catalyst from line 16 before entering the reactor 12, for example, if there is danger of undesirable hydrocarbon conversion in the transfer line, the hydrocarbon feed can be preheated separately and introduced into reactor 12 separately from the hydrogen stream by a line not shown in the drawing. In this case the regenerated catalyst from line 16 can be transported to the reactor with the stream of preheated hydrogen passing through line 10 instead of with a mixed hydrocarbon-hydrogen stream.

A temperature above 950° F. is maintained in reactor 12, all heat being supplied by the preheating of the feed stream in furnace 11 and by the heating of the catalyst in regenerator 15. The fluid-bed reactor 12 functions acording to principles known in the art. The powdered catalyst is maintained in a turbulent suspended state by the upflowing vapor stream, the velocity of which is controlled so as to keep the catalyst suspended within the reactor while vapor passes overhead from the reactor via line 17. A stream of catalyst is continuously withdrawn from the bottom of the reactor by the standpipe 18. Apparatus needed for proper functioning of the system such as compressors, pumps and cyclone separators are omitted from the drawing because their operation is well known in the art.

The reactor effluent is passed by line 17 through a separation system of conventional design, well known to those skilled in the art. This system is indicated diagrammatically in the drawing by heat exchanger or condenser 20, where the stream is cooled to condense the normally liquid hydrocarbons, and by separator 21, wherein the condensed liquid is separated from light gases. The gas, principally hydrogen, is withdrawn from the separator by line 22 and a portion is recycled by line 14, furnace 11 and line 10, as previously mentioned. The liquid from separator 21 is passed to a benzene recovery unit from which, if desired, unconverted hexane can be recycled to the feed stream. Other more involved equipment would be used to obtain economically the degree of separation desired in a commercial embodiment of the process. For example, it also would be desirable to provide a compressor and an absorber to help eliminate the heavier hydrocarbons from the hydrogen stream as well as additional auxiliary equipment. Such apparatus is well known in the art and in the interest of simplicity is omitted from the diagrammatic drawing.

As stated above, a stream of catalyst is continuously withdrawn from the bottom of the reactor 12 by the standpipe 18. This catalyst contains a small carbonaceous deposit, amounting to less than 4 weight percent, and preferably less than 2 weight percent, of the hydrocarbon feed charged to the reactor in the same length of time that the catalyst is withdrawn. This coke or carbonaceous deposit must be removed to maintain the activity of the catalyst. The catalyst is transported to the upper portion of the regenerator 15 by a stream of air introduced by line 24. The catalyst having a carbonaceous deposit thereon is blown into the upper part of regenerator 15 wherein the carbon is burned from the catalyst. The combustion gas containing a high concentration of carbon dioxide is withdrawn overhead from the regenerator by line 25. A stream of catalyst is continuously passed from the upper part of regenerator 15 via standpipe 26 to the lower part of the regenerator.

In the regeneration carried out in the upper section of regenerator 15 a large part of the carbon is burned from the catalyst but some carbon unavoidably remains on the catalyst pased by standpipe 26 to the lower part of the regenerator. This is a characteristic of the fluidized catalyst type of regeneration. The catalyst particles in the suspended bed in the upper part of the regenerator are in a state of turbulence and in any zone of the turbulent bed some of the catalyst particles will be particles that have been in the regenerator long enough to have had carbon burned off while other particles will be particles freshly received from the reactor and will still contain a carbon deposit. Therefore, the stream of catalyst entering the standpipe 26 will be a mixture of particles having no carbon thereon and of particles still retaining all or part of their carbonaceous deposit. However, the average carbon content of the catalyst passing by line 26 to the lower part of the regeneration zone is much lower than that of the catalyst introduced from the reactor into the upper portion of the regenerator. More specifically, at least about 80 percent of the carbon deposited on the catalyst during the preceding reaction phase is removed in the upper part of the regenerator.

We have discovered that it is advantageous to reduce the carbon content of the catalyst during regeneration to the lowest possible level. The degree of carbon removal in a single regeneration stage, as in the upper part of regenerator 15, is not sufficient to restore the catalyst to its highest aromatization activity. Furthermore, since the catalyst has only a small carbonaceous deposit when introduced to the regenerator by line 24, owing to the fact that a high purity hexane charge stock is used, the burning of even all of this amount of carbon does not produce enough heat to raise the catalyst temperature to the level required for maintaining reaction temperature in the reactor 12. Therefore, in accordance with our invention we perform a second stage regeneration of the catalyst in the lower part of regenerator 15 wherein we remove substantially all of the remaining carbonaceous deposit from the catalyst and also contact the catalyst with a high temperature gaseous combustion product which is either free of carbon dioxide or contains no more than a very low concentration thereof. As we will show by test data hereinafter we restore the catalyst activity to a higher level by heating in an atmosphere of low or negligible carbon dioxide content in the lower part of regenerator 15 than can be accomplished by heating the catalyst in an atmosphere having a high content of carbon dioxide.

A stream of air or of air diluted with an inert gas other than carbon dioxide is introduced to the bottom of regenerator 15 by line 28. The oxygenic atmosphere provides further oxygen for the burning of substantially all of the remaining carbonaceous deposit from the suspended catalyst particles in the lower part of the regenerator. At the same time, a gaseous stream composed mainly of steam and nitrogen and containing no more than very small amounts of carbon oxides at a temperature, for example, above about 1070° F. is introduced to the suspended catalyst bed in the lower part of the regenerator by line 29. This hot gas is obtained by burning a hydrogen stream having no more than a small or negligible hydrocarbon content. The preferred source of this hydrogen-rich fuel gas is shown in the drawing which shows that a portion of the recycle hydrogen is diverted via line 30 to a burning chamber 31. In the burning chamber the hydrogen stream is contacted with air or oxygen introduced by line 32 and is burned to yield a hot combustion gas composed mainly of steam and nitrogen, the latter being present if the hydrogen is burned with air. Water or steam can be injected through line 33 into the effluent gas stream from burning chamber 31 to lower the temperature or increase the steam partial pressure of the combustion gas if desired.

A large amount of hydrogen is evolved in the aromatization reactor 12. This amount of hydrogen will normally be sufficient to supply hydrogen for the burning chamber 31 and hydrogen for admixture with the feed in line 14 in a concentration for example of 1500 standard cubic feet per barrel of hydrocarbon. In fact, the hydrogen evolved in reactor 12 will ordinarily be in excess of the above needs. Excess hydrogen can be withdrawn via line 34.

In burning carbon from a fluidized catalyst, as in the suspended catalyst bed in the upper part of regenerator 15, the catalyst particles will unavoidably be thoroughly mixed with the gaseous combustion product containing a high concentration of carbon dioxide. We have discovered that regeneration in this manner cannot restore the aromatization activity of a chromia-alumina catalyst to its original high level. In the first place, as mentioned above, the suspended bed method of regeneration makes it impossible to remove all carbon from all particles of catalyst and carbon must be almost entirely removed in order to restore completely the aromatization activity of a chromia-alumina catalyst. More importantly, the contacting of a catalyst with an atmosphere rich in carbon dioxide, which occurs in fluid bed regeneration because the catalyst particles are turbulently mixed with the carbon dioxide-rich combustion product, prevents restoration of the aromatization activity of the chromia-alumina catalyst to its highest level.

In accordance with our invention we avoid these problems by subjecting the catalyst to at least one additional treatment after the initial carbon burning stage that takes place in the upper part of the regenerator. As shown in the drawing, we pass the catalyst, which has a low average carbon content after the first regeneration stage, to a second fluidized catalyst bed in the lower part of the regenerator. Catalyst passes from the upper part to the lower part of the regenerator via the catalyst standpipe 26. The column of densely packed catalyst in a standpipe 26 serves as a seal between the zones and prevents the combustion gas of the upper zone from entering the lower zone.

In the lower catalyst bed of regenerator 15 all or almost all of the small amount of carbon remaining on the catalyst is burned. This forms some carbon dioxide. However, the concentration of carbon dioxide in the atmosphere contacting the catalyst in the lower bed is much lower than the concentration in contact with the catalyst in the upper bed because much more carbon is burned in the upper bed than in the lower.

As a result of the second stage burning and stripping of the suspended catalyst in the lower part of regenerator 15, the catalyst withdrawn by standpipe 16 from the bottom of the regenerator and charged to the reactor has a very low carbon content. The average carbon content of the particles will be no greater than about 0.5 weight percent. Furthermore, the catalyst will have been almost entirely stripped of any adsorbed carbon dioxide by contact with the hot steam introduced by line 29. The temperature of the catalyst particles will have been raised to at least 1000° F. or at least 50° F. above the reaction temperature in reactor 12 so that the heat required for the endothermic reactions occurring in reactor 12 will be supplied.

It is essential that our final regeneration phase, such as the regeneration in the lower part of regenerator 15, be carried out in an atmosphere of low or negligible carbon dioxide content. However, the regeneration phase or phases before the final phase can be carried out in an atmosphere containing carbon oxides. Therefore, if desired, a hydrocarbon fuel can be burned and the hot combustion product thereof can be charged to the initial regeneration phase or phases to aid in heating the catalyst. Also, for heat economy, it is permissible to pass the hot flue gas from the final regeneration zone into the preceding regeneration zone or zones to supply heat to the catalyst and to take advantage of any unconsumed oxygen in the final or second-stage flue gas. If the final regeneration phase is carried out in an atmosphere of low or negligible carbon oxides content the contact of the catalyst in the preceding regeneration zone or zones with combustion gas containing carbon dioxide will not be harmful.

We have carried out a series of runs in the aromatization of n-hexane over a chromium oxide-alumina catalyst which demonstrate the importance of our method of regeneration. The procedure common to each of the runs is described in the following example, and the results and certain conditions of each run are shown in the table that follows the example.

EXAMPLE

The charge stock was a normal hexane fraction containing about 99 mole percent n-hexane. The catalyst was a coprecipitated chromium oxide-alumina catalyst containing 27 weight percent $Cr_2O_3$. The catalyst had beed treated with an NaOH solution after its preparation. Before each run the catalyst was pre-reduced by contact with a stream of hydrogen at about 1022° F. for at least one hour. In each run the catalyst was alternately regenerated with an oxygenic gas to burn off carbonaceous deposits from a previous run and then used for aromatization of the n-hexane charge stock. The regenerations were carried out at temperature from 1000 to 1150° F. and in certain of the runs the regeneration gas included steam and/or carbon dioxide as shown in the table below. The n-hexane charge stock was charged to the reactor, containing catalyst regenerated by the procedure as indicated in the table below for each run, at a liquid-hourly space velocity of 1.0 vol./vol./hr., a temperature of about 1022° F. and in a hydrogen concentration of about 1500 standard cubic feet of hydrogen per barrel of liquid hydrocarbon. The armatization stage of each run was continued for a throughput of about 4.0 liquid volumes of hydrocarbon per volume of catalyst. Further details of the conditions and aromatization results of each run are given in the table which follows. In the table the column under each run number includes data on the regeneration gas composition and the regeneration temperature. It should be understood that these data apply to the regeneration that was performed before the aromatization stage of the run.

Table I
HEXANE AROMATIZATION

| Run No. | 105 | 106 | 107 | 108 | 109 | 110 | 111 | 112 | 113 |
|---|---|---|---|---|---|---|---|---|---|
| Regeneration Gas Comp. | Air | Air | Air + steam: 1:1.5 volume ratio. | Air + 7% $CO_2$. | Air + 8% $CO_2$ + 16% steam. | Air + 9% $CO_2$ + 16% steam. | Air | Air | Air. |
| Regeneration Temperature. | 1,000° F | 1,050° F | 1,050° F | 1,050° F | 1,050° F | 1,050° F | 1,050° F | 1,100° F | 1,150° F. |
| Weight Balance, Weight Percent: | | | | | | | | | |
| Dry Gas | 13.40 | 12.89 | 13.33 | 12.92 | 11.71 | 11.15 | 11.58 | 11.34 | |
| Liquid Product | 86.52 | 86.32 | 86.16 | 87.09 | 87.77 | 88.42 | 87.50 | 87.34 | 86.98. |
| Coke | 0.64 | 0.59 | 0.62 | 0.61 | 0.61 | 0.31 | 0.50 | 0.54 | 0.62. |
| Loss | −0.56 | 0.19 | −0.11 | −0.62 | −0.09 | +0.12 | +0.42 | +0.78 | |
| Efficiency, Moles of Benzene per 100 Moles of Hexane Reacted. | 73 | 72 | 73 | 72 | 68 | 70 | 71 | 72 | 73. |
| Total Conversion, Mole percent | 67 | 66 | 67 | 61 | 53 | 54 | 59 | 61 | 64. |
| Benzene Yield, Weight Percent. | 44 | 43 | 44 | 40 | 33 | 34 | 38 | 40 | 43. |

Table I shows that in Runs 105 and 106, in which the catalyst was regenerated with air at 1000° F. and 1050° F. respectively, the benzene yield was 44 and 43 weight percent respectively. In Run 107 the air was mixed with steam in a volume ratio of 1 to 1.5. The benzene yield remained at the same high level, thus showing that steam does not lower the aromatization activity of the chromia-alumina catalyst. However, in Run 108 the regeneration gas was composed of air and 7 percent carbon dioxide. The benzene yield of the aromatization stage dropped to 40 weight percent. The benzene yield dropped further in Runs 109 and 110 when the regeneration gas included air and a mixture of carbon dioxide and steam. In Runs 111, 112 and 113 the benzene yield progressively increased as regeneration was carried out with air alone and at progressively higher temperatures of 1050° F., 1100° F. and 1150° F. The results clearly show the bad effect on the aromatization activity of the chromia-alumina catalyst of having as much as 7 percent carbon dioxide in the regeneration gas, especially when the carbon dioxide is mixed with steam. The results show that the activity loss is not permanent and can be restored by regeneration with air that contains no substantial amount of carbon dioxide. In the above example the catalyst was maintained in a stationary fixed bed. When this kind of bed is regenerated the catalyst particles, after having been burned, remain in an atmosphere of the regenerating gas which continues to flow through the bed. Therefore, the effect of various gas compositions on the second stage regeneration of a fluid bed catalyst can be demonstrated in a single stage fixed-bed regeneration.

We have described specific embodiments of our process and will now discuss variations in the elements of the process.

The charge stock for our process is a high purity hexane fraction. By this we mean a fraction that contains little or no material other than hexanes, especially materials that cause heavy carbon laydown on the catalyst under hexane aromatization conditions. The preferred charge stock is a high purity normal hexane fraction containing at least about 70 volume percent n-hexane. Since the object of the process is to produce benzene, other benzene producers such as cyclohexane or the hexenes can also be present. Branched hexanes such as the methylpentanes and dimethylbutanes do not cause excessive carbon deposition but neither are they appreciably converted to benzene. Therefore, they serve no useful purpose and preferably are not present in large concentrations in the feed. Cyclopentane and its alkyl substituted derivatives, such as methyl and ethylcyclopentane, cause carbon deposition under the aromatization conditions of the process. Therefore, these materials should be separated from the feed as completely as possible without excessive cost. As an example, the composition of a preferred feed stock for our process is as follows: n-hexane, 80 volume percent; branched chain hexanes, less than 5.0 volume percent; branched chain heptanes, less than 0.2 volume percent; cyclohexane, less than 0.2 volume percent; cyclopentane and alkyl-substituted cyclopentanes, less than 15.0 volume percent; and other hydrocarbons, less than 5.0 volume percent.

The reaction conditions for the aromatization stage of our process can extend over the ranges suitable for aromatization of hexane over a fluidized chromium oxide-alumina catalyst. For example, the temperature can be from 950 to 1100° F., and preferably is from 1000 to 1050° F. The pressure will be low, that is below 100 pounds per square inch gauge and preferably below 25 pounds per square inch gauge. The liquid-hourly space velocity of the charge stock can be from 0.1 to 5 volumes of liquid feed per volume of catalyst per hour.

The hexane charge stock is contacted with the fluidized chromium oxide-alumina catalyst in admixture with hydrogen. This can be highly purified hydrogen or an impure stream such as a recycle gas stream containing 80 or 90 percent hydrogen and the rest light hydrocarbons, principally methane and ethane. The hydrogen concentration in the charge to the reaction zone should be from 1,000 to 6,000 standard cubic feet of hydrogen per barrel of liquid hydrocarbon.

The catalysts for our process are composed of a major amount of alumina and a minor amount of chromium oxide or chromia, as it is sometimes called. They can be prepared by impregnating with chromium nitrate an activated alumina or an activated alumina containing a small amount of silica, followed by thermal decomposition of the chromium nitrate to form a chromium oxide-alumina composite. The catalyst can also be prepared by coprecipitation of alumina and chromium oxide followed by washing, drying and calcining. Preferred catalysts contain from 5 to 30 percent $Cr_2O_3$ and the balance essentially alumina. The catalysts can be improved by treatment with a sodium hydroxide or potassium hydroxide solution. The catalyst is in a powdered or finely divided particle form, the majority of the catalyst being of a particle size of 20 to 100 microns maximum diameter.

As we have described, the regeneration stage of our process is carried out in at least two phases. In the first phase the catalyst is contacted with a stream of air, oxygen or of oxygen mixed with an inert diluent gas at a temperature of at least 950° F. The temperature, the residence time of catalyst and the rate of oxygen introduction for the initial regeneration phase or phases are selected so as to remove at least about 80 percent of the fresh carbon from the catalyst. The catalyst having no more than a small carbon content is then regenerated in the final phase of the regeneration stage.

The temperature of the final phase is at least 50° F. higher than that of the first phase of the regeneration and is substantially above, for example, at least 50° F. above the reactor temperature. Since the reactor temperature is at least 950° F. the final phase regeneration temperature will be at least about 1000° F. Preferably, the temperature of the final phase regeneration is at least 1070° F. and can be as high as about 1200° F. In the final phase, the catalyst is again contacted with a stream of air, oxygen or of oxygen diluted with an inert gas other than carbon dioxide. Simultaneously, the catalyst is contacted with a stream of hot gas formed by the burning of hydrogen or of a fuel gas highly concentrated in hydrogen.

The rate of introduction of the hot combustion gas to the second or final phase of the regeneration stage will depend upon the amount of heat required to be added to the catalyst. This, in turn, will depend to some extent on the amount of carbon deposited on the catalyst before regeneration. This can be illustrated by a consideration of the heat balance in a typical commercial embodiment of our process, for example, a plant producing 10,380 pounds per hour of benzene. The heat that must be supplied to maintain the reaction is about 19,000,000 B.t.u./hr. The catalyst charged to the regeneration zone contains, for example, a coke deposit amounting to about 1.7 weight percent of the hexane feed to the reactor. Regeneration of this catalyst produces about 12,000,000 B.t.u./hr. Therefore, this deficiency of about 7,000,000 B.t.u./hr. together with the heat required for preheating the fuel and air and the heat loss in the hot flue gases leaving the regeneration zone, must be supplied by the burning of hydrogen to produce a hot combustion gas for direct heat exchange with the catalyst in the final regeneration phase and possibly also by burning of a hydrocarbon fuel to produce hot combustion gas for heat exchange with the catalyst in the initial regeneration phase or phases.

The final phase regeneration of the catalyst in our process must be carried out in a low or negligible concentration of carbon dioxide. Some carbon dioxide will be produced by the burning of the small amount of carbon remaining on the catalyst from the first phase of the regeneration and some carbon dioxide will be present in the hot combustion gas if the hydrogen fuel stream contains methane or other hydrocarbons. In order to keep the carbon dioxide content in the second or final phase as low as possible, it is important that the carbon be removed as completely as possible during the initial regeneration phase or phases, and that the hydrogen stream charged to the burning zone have a low or negligible hydrocarbon content. Preferably, the atmosphere in the final regeneration zone contains less than about 3 percent carbon dioxide.

We have described our process in its preferred embodiment in which the regeneration of the catalyst is carried out in two phases, the first of which is carried out in the upper portion of a regeneration zone and the second of which is carried out in the lower portion of the regeneration zone. Normally, the regeneration phases will accomplish the purpose of removing in the first phase at least 80 percent of the carbon laid down during the preceding reaction phase and removing all but a very small amount of the remaining carbon in a second phase carried out in an atmosphere having a very low carbon oxide content. However, the invention in its broadest form extends to the use of more than two regeneration phases, the essential features being that the final regeneration phase is carried out in an atmosphere of very low or negligible carbon oxide concentration, the carbon content of the catalyst after the final regeneration phase is very low, e.g., less than 0.5 weight percent, and the catalyst temperature after the final regeneration phase is substantially above, e.g., at least 50° F. above, the reactor temperature.

The preferred embodiment of our process in which the second or final regeneration zone lies below the first has the advantage of permitting gravity flow of catalyst from the first regeneration phase in the upper regeneration zone to a subsequent phase or phases in a lower regeneration zone or zones. However, our process can be carried out with the regeneration zones disposed at levels other than as described for the preferred embodiment.

Obviously many modifications and variations of the invention as hereinbefore set forth may be made without departing from the spirit and scope thereof and therefore only such limitations should be imposed as are indicated in the appended claims.

We claim:

1. In a process for converting a fraction containing at least 70 volume percent normal hexane to benzene in an aromatization zone at an elevated temperature in the presence of hydrogen and a chromia on alumina catalyst and wherein hydrocarbon conversion products and a stream of said catalyst having a carbonaceous deposit thereon are separately removed from said aromatization zone, the improvement which comprises passing said removed catalyst to a regeneration zone wherein at least 80 percent of said carbonaceous deposit is removed by burning with an oxygen-containing gas at a temperature below the temperature existing in said aromatization zone, passing all of the catalyst from said regeneration zone to a second zone which has an atmosphere separate and distinct from the atmosphere in the first zone and substantially free from the oxides of carbon, burning a gas consisting essentially of hydrogen in a hydrogen-burning zone, introducing combustion products of said hydrogen-burning zone consisting essentially of steam plus a gas selected from the group consisting of air and oxygen into said second zone to raise the temperature of the catalyst therein to a level at least about 50° F. above that existing in said aromatization zone and thereafter recirculating the latter catalyst to said aromatization zone.

2. In a process for converting a fraction containing at least 70 volume percent normal hexane to benzene in an aromatization zone at an elevated temperature in the presence of hydrogen and a chromia on alumina catalyst and wherein hydrocarbon conversion products and a stream of said catalyst having a carbonaceous deposit thereon are separately removed from said aromatization zone, the improvement which comprises passing said removed catalyst which has a carbonaceous deposit of less than four weight percent of the hydrocarbon feed to a regeneration zone wherein at least 80 percent of said carbonaceous deposit is removed by burning with an oxygen-containing gas at a temperature below the temperature existing in said aromatization zone, passing all of the catalyst from said regeneration zone to a second zone which has an atmosphere separate and distinct from the atmosphere in the first zone, and substantially free of the oxides of carbon, burning a gas consisting essentially of hydrogen in a hydrogen-burning zone, introducing combustion products of said hydrogen-burning zone consisting essentially of steam plus a gas selected from the group consisting of air and oxygen into said second zone to raise the temperature of the catalyst therein to a level at least about 50° F. above that existing in said aromatization zone and thereafter recirculating the latter catalyst containing less than 0.5 weight percent carbonaceous deposit to said aromatization zone.

3. In a process for converting a fraction containing at least 70 volume percent normal hexane to benzene in an aromatization zone at an elevated temperature in the presence of hydrogen and a chromia on alumina catalyst and wherein hydrocarbon conversion products and a stream of said catalyst having a carbonaceous deposit thereon are separately removed from said aromatization zone and wherein hydrogen is separated from said conversion products, the improvement which comprises passing said removed catalyst which has a carbonaceous deposit of less than four weight percent of the hydrocarbon feed to a regeneration zone wherein at least 80 percent of said carbonaceous deposit is removed by burning with an oxygen-containing gas at a temperature below the temperature existing in said aromatization zone, passing all of the catalyst from said regeneration zone to a second zone which has an atmosphere separate and distinct from the atmosphere in the first zone and substantially free of the oxides of carbon, burning a portion of said hydrogen separated from said conversion products in a hydrogen-burning zone, introducing combustion products of said hydrogen-burning zone consisting essentially of steam plus a gas selected from the group consisting of air and oxygen into said second zone to raise the temperature of the catalyst therein to a level at least about 50° F. above that existing in said aromatization zone and thereafter recirculating the latter catalyst to said aromatization zone.

References Cited in the file of this patent

UNITED STATES PATENTS

| | | |
|---|---|---|
| 2,692,847 | Rex | Oct. 26, 1954 |
| 2,710,827 | Gornowski | June 14, 1955 |
| 2,733,282 | Drews et al. | Jan. 31, 1956 |
| 2,751,332 | Gornowski et al. | June 19, 1956 |
| 2,883,335 | Smith | Apr. 1, 1959 |